INVENTOR.
WILLIAM C. EDWARDS

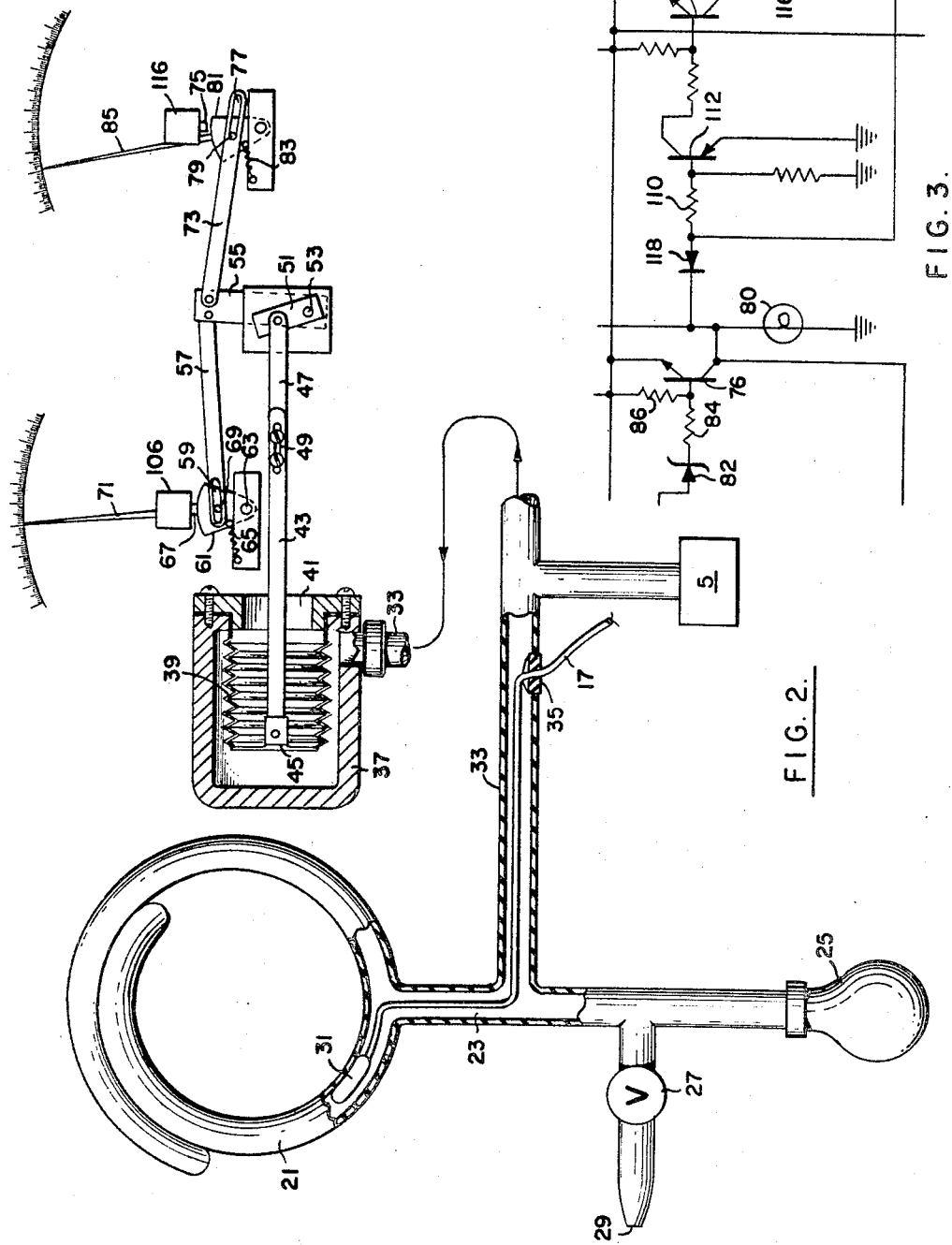

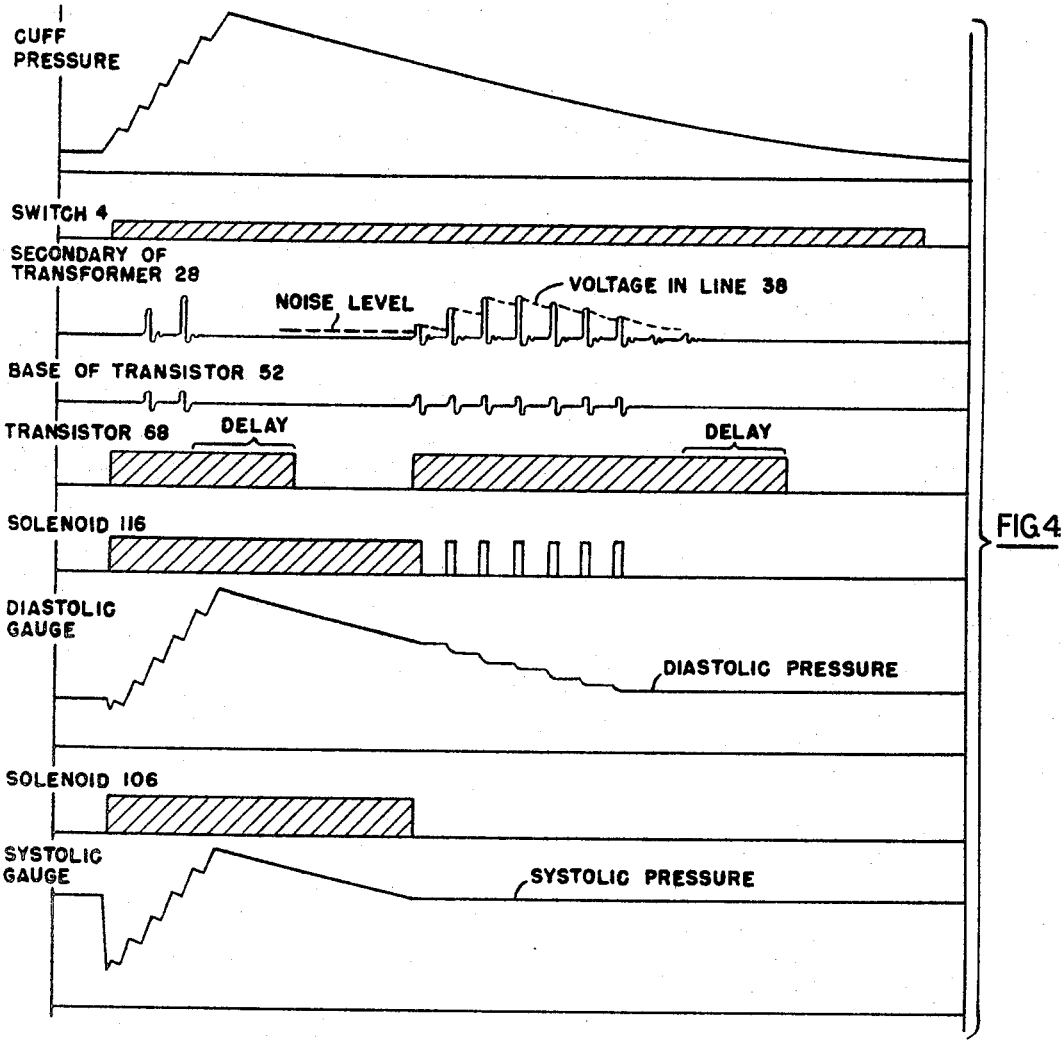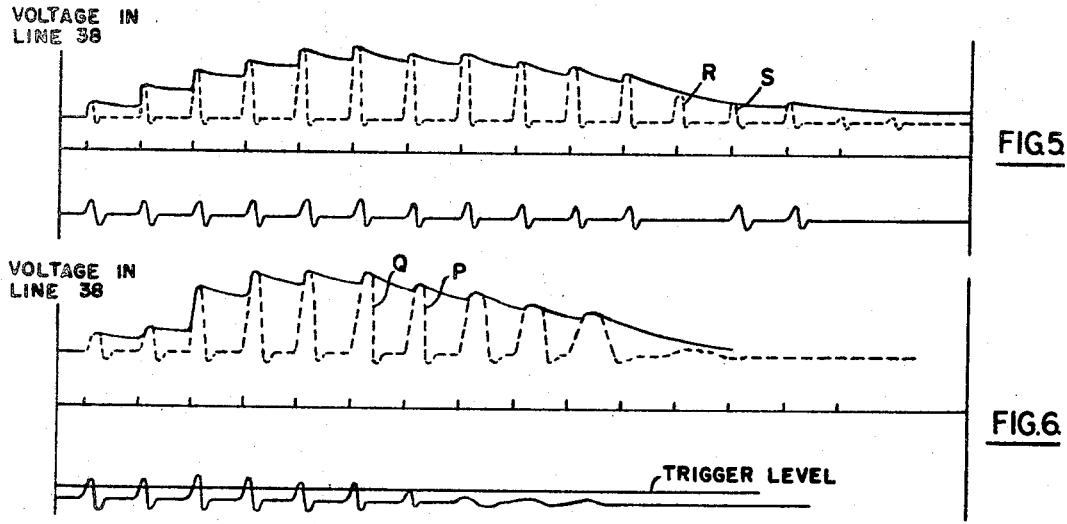

United States Patent Office 3,405,707
Patented Oct. 15, 1968

3,405,707
APPARATUS FOR MEASURING
BLOOD PRESSURE
William C. Edwards, Plandome Manor, N.Y., assignor to Smith Kline & French Laboratories, Philadelphia, Pa., a corporation of Pennsylvania
Filed June 23, 1965, Ser. No. 466,351
15 Claims. (Cl. 128—2.05)

ABSTRACT OF THE DISCLOSURE

A blood pressure measuring apparatus includes a microphone delivering electrical signals corresponding to Korotkoff sounds through a filter, which passes successively higher frequencies more readily, and thence to a control circuit. The control circuit causes arrest of a systolic pressure gauge when a first Korotkoff sound is detected, and momentarily releases a diastolic gauge upon the detection of each Korotkoff sound. An integrator receives the output of the filter, and aids the filter in distinguishing between electrical signals which do not correspond to Korotkoff sounds. The detecting means is desensitized automatically following a predetermined interval after the detecting means ceases to receive Korotkoff sounds.

---

This invention relates to the measurement of blood pressure, and particularly to a device which is completely automatic, and which does not require the skills of a trained operator or a physician for its operation.

Numerous automatic apparatuses for measuring blood pressure are known. United States Patent 3,117,570 discloses a typical automatic blood pressure measuring device. The majority of such devices in the prior art seek to measure blood pressure in much the same manner as a physican. An inflatable "cuff" is wrapped around the upper arm of the person whose blood pressure is to be measured, and is inflated with air until the main artery in the arm is completely constricted so that no flow of blood takes place. A microphone (corresponding to the doctor's stethoscope) is positioned against the arm at a suitable point to detect the pulse. When the artery is completely constricted, the pulse ceases. The minimum pressure in the cuff required to constrict the artery is called the systolic pressure.

Air is allowed to escape slowly from the cuff. As the artery opens, the resulting rush of blood causes characteristic "Korotkoff" sounds to be picked up by the microphone. These sounds appear as pulsations which continue as cuff pressure decreases until the artery is expanded to its normal condition. At this time, the Korotkoff sounds cease. The pressure of the air within the cuff at this time is known as "diastolic pressure." Thus, a blood pressure reading consists of two separate pressure readings, e.g. 140/80. 140 is the systolic pressure and 80 is the diastolic pressure in millimeters of Hg (gauge).

The apparatus disclosed in the aforementioned patent and many other related devices operate to retain these systolic and diastolic readings on gauges which are arranged to read the pressure of the air within the cuff, and which operate by arresting the pointers on the gauges at appropriate time determined by the existence or non-existence of Korotkoff sounds. Alternatively, certain of these apparatuses operate by closing off valves in the air lines between the cuff and the gauges.

The major difficulty encountered in measuring blood pressure by this general method arises from the differences among various patients as to the amplitudes of their Korotkoff sounds. The characteristic Korotkoff sounds of one patient may be as much as three hundred times as loud as those of another. It has been observed, however, that the level of background noise generally corresponds with the level of the Korotkoff sounds. The present invention takes advantage of this observation by providing a distinguishing system which responds to the difference between the energy level of the Korotkoff sounds and the noise level. In some patients, the amplitudes of the Korotkoff sounds may decrease considerably as pressure decreases from systolic to diatolic. Consequently, the prior apparatus fails to insure that the apparatus will respond to the later Korotkoff sounds.

The character of the Korotkoff sounds of one patient may differ considerably from that of another patient. Variations can also occur in one patient from time to time and the character of the sounds usually varies between systolic pressure and diastolic pressure in a measuring cycle. These variations may be in amplitude, pitch, frequency, energy level and the time rate of change of the energy level in a given Korotkoff sound, i.e. the shape of its envelope. Any combination of these variations can occur, and it will be seen that the invention is capable of producing accurate and consistent readings by identifying Korotkoff sounds by taking all of these variations into account.

There are differences among patients as to other characteristics of their Korotkoff sounds. In some, Korotkoff sounds will appear to cease, and will reappear. Prior automatic apparatuses will indicate and retain a reading of diastolic pressure immediately upon cessation of Korotkoff sounds. If they were to reappear, the reading retained for diastolic pressure would be false. The present invention seeks to eliminate the possibility of such a false reading.

While the various apparatuses in the prior art may give consistent blood pressure readings for individual patients, certain of these reading are likely to differ considerably with the readings obtained manually by a physician. Consequently, the present invention seeks to duplicate the mental process by which a physician obtains a reading. The apparatus of the present invention can be set so that both of its readings corresponds to that of a particular physician, and, since it operates essentially by the same process as the physician, subsequent readings by the apparatus will be within close tolerances of those which would be made by that physician.

The mental process by which a physician obtains blood pressure readings is essentially a learning process. That is, the acuteness of his hearing and, consequently, his ability to percieve Korotkoff sounds, varies during a reading period.

As the pressure in the cuff decreases to approach systolic pressure, only background noises are heard. The acuteness of the listener's hearing increases until he may be able to perceive a Korotkoff sound only one db above the noise level. The physician notes the pressure at above the first detected Korotkoff sound occurs. Each subsequent Korotkoff sound is compared with more sounds immediately previous to it, and, as each succeeding sound occurs, the memory of the preceding sounds fades.

The decision as to when the Korotkoff sounds cease involves the determination that the energy of a subsequent sound is so much lower than that of the immediately preceding sound that it cannot be considered to be a Korotkoff sound, or that the rate of change of energy in a subsequent sound is lower than a predetermined limit.

On the other hand, pulsations having substantial energy might occur after the last Korotkoff sound. They, however, will be distinguishable from the immediately preceding sounds by virtue of their decrease in amplitude, pitch, energy or rate of change of energy or various combinations thereof. These subsequent sounds will appear to be muffled. When the detected sounds cease or become muffled, some physicians record the pressure indicated at this time as diastolic. The rate of decrease in amplitude, pitch or energy can be gradual, but there is a predetermined rate which must be exceeded before diastolic pressure occurs. The invention provides a means for producing the predetermined rate and a means for comparing the actual rate of decrease of these parameters with that predetermined rate. Thus the apparatus preconditions itself in the same manner as a physician.

An object of this invention, therefore, is to simulate the process by which a human with a stethoscope determines blood pressure.

A further object is to obtain improved accuracy and consistency in blood pressure measurements.

A third object of this invention is to provide an automatic apparatus for measuring blood pressure in which the detrimental effects of extraneous noises and noises which occur after the diastolic point is reached are eliminated. These and other objects of this invention will be apparent from the following description read in conjunction with the accompanying drawings in which:

FIGURE 2 is a diagram illustrating an inflatable cuff, a pair of gauges and the various other mechanical parts associated with the invention;

FIGURE 3 is a schematic diagram illustrating a modification of the electrical circuitry of FIGURE 1;

FIGURE 4 is a diagram illustrating the overall operation of an embodiment of the invention;

FIGURE 5 is a diagram illustrating one manner in which the invention determines diastolic pressure; and FIGURE 6 is a diagram illustrating another manner in which the invention determines diastolic pressure.

Figure 1:
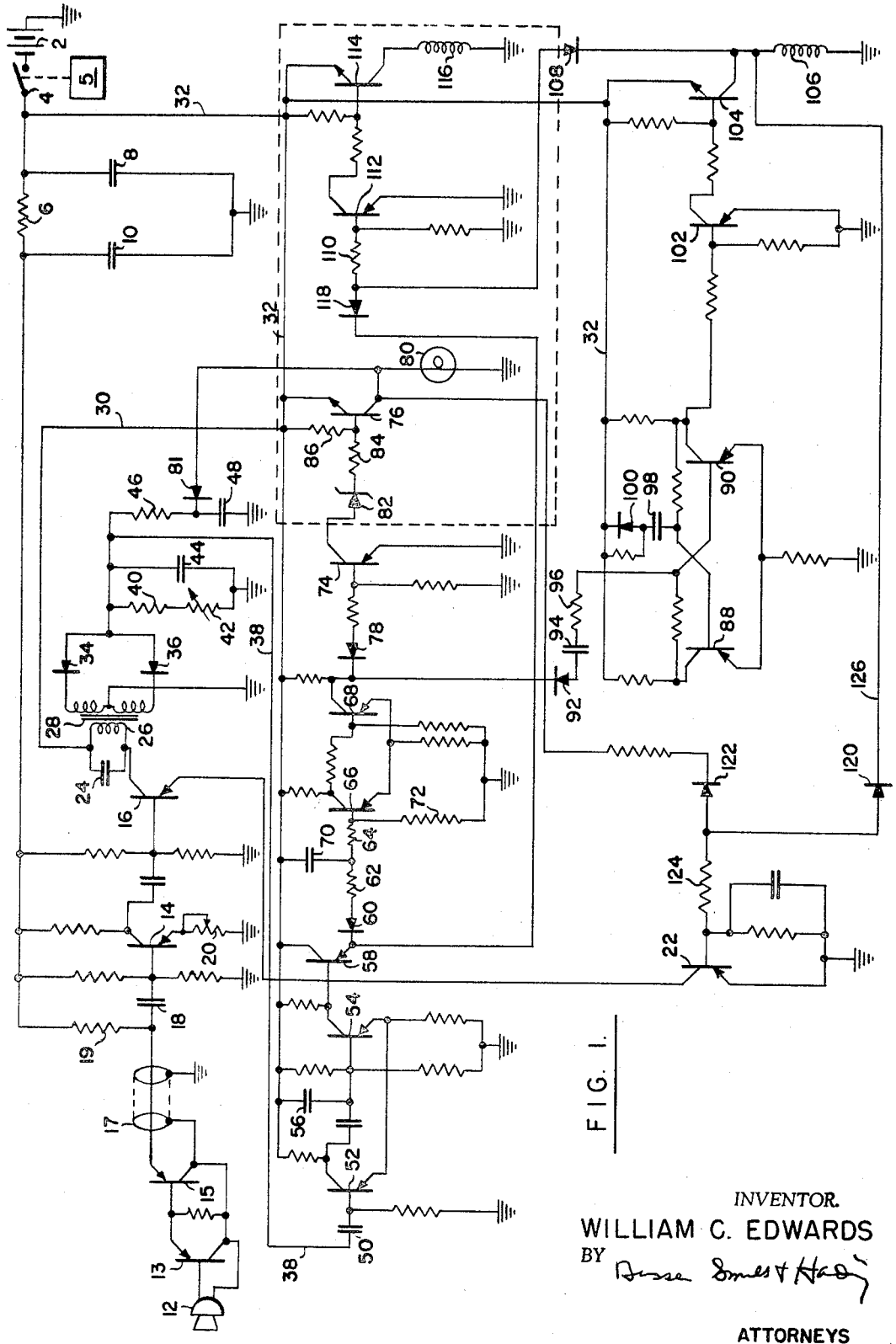
FIGURE 1 is a schematic diagram of the electrical circuitry of the present invention.

This invention involves the cooperation of what can be considered two distinct parts. The first is the signal processing circuitry which performs the function of determining what is, and what is not a Korotkoff sound, and which delivers a series of output pulses in response only to Korotkoff sounds. The second part of the circuit involves the logic circuitry which receives the output of the signal processing device, and which causes gauges to retain an indication of systolic and diastolic pressure.

Referring to FIGURE 1, both parts of the circuit are powered by a battery 2, which provides a negative supply voltage through on-off switch 4. This switch is desirably provided with a pressure operated actuator 5 associated with an air line leading from the interior of the cuff. This actuator is arranged to respond to pressure in the cuff so that, when the cuff pressure is more than a predetermined amount above atmospheric pressure, the switch is closed.

The signal processing part of the circuit is isolated from the remainder of the circuit by a filter comprising series resistor 6 and shunt capacitors 8 and 10. Direct current power for the operation of the signal processor is delivered through resistor 6. The reasons for the provision of the filter will be apparent when it is considered that slight variations in the supply voltage resulting from operation of the control circuitry might result in a malfunction or false indication in the sensitive signal processing circuit.

A crystal or ceramic microphone 12, which will be placed in a suitable position to detect Korotkoff sounds, is provided in association with a conventional Darlington preamplifier comprising transistors 13 and 15 in cascade. The output taken from the emitter of transistor 15 is fed through the center conductor of shielded cable 17. The outer conductor is connected to the collector of transistor 15 which is grounded. The preamplifier serves to match the high impedance of the microphone to the low input impedance of the amplifier which receives its output. D.C. power for the operation of the preamplifier is delivered through resistor 19 and through the inner conductor of the shielded cable. Thus, only two conductors are required between the preamplifier and the rest of the circuit, and a tidy arrangement results, the only connections between the patient's arm and the measuring device being the air line between the cuff and the gauges and the single shielded cable 17. It will be apparent that the microphone does not need to be a conventional microphone such as those suitable for use in voice transmission. Various other transducers which transform mechanical pulsations into electrical signals can be used as well.

As shown in FIGURE 2, an inflatable cuff 21 is provided with a passage 23 through which it can be inflated by a conventional squeeze-bulb and one-way valve assembly 25. A valve 27 and a restricted orifice 29 are provided to permit air to be bled off slowly from the cuff.

Within cuff and in an appropriate position to detect Korotkoff sounds, there is provided assembly 31 which comprises, in encapsulated form, both microphone 12 and the Darlington preamplifier. Shielded cable 17 is fed through passages 23 and 33 and emerges from passage 33 through an airtight opening 35.

Actuator 5 is connected to respond to pressure in passage 33.

Passage 33 leads from the cuff to the interior of an enclosure 37 in which there is arranged a metal bellows 39 separating the interior of the enclosure from opening 41. Opening 41 is provided to admit air at atmospheric pressure to the interior of the bellows, and to permit the passage of rod 43 which is pivoted at one end in member 45. Member 45 serves to close off one end of the bellows. Rod 43 is attached to rod 47 through a suitable adjusting means 49. Rod 47 is pivotally connected to crank 51, which, in turn, is fixed to a shaft 53 which drives arm 55. Pivotally connected to arm 55 is a rod 57 having a lengthwise slot 59. A wedge-shaped element 61 is fixed to a rod 63. This element is urged toward the left by a coil spring 65.

A piston 67 of solenoid 106 is shown in contact with a surface of the wedge-shaped element, this surface being in the form of an arc of a circle concentric with rod 63. The piston acts as a brake and prevents movement of element 61 under the action of spring 65. Piston 67 is shown in the position in which solenoid 106 is de-energized. When the solenoid is energized, piston 67 is withdrawn from the surface of element 61, and element 61 is permitted to move under the action of spring 65 until pin 69, which is fixed to element 61, engages the left-hand end of slot 59.

Needle 71 is fixed to the opposite end of shaft 63, and moves with element 61. Needle 71 is the systolic gauge indicator.

There is also provided a rod 73 pivoted at one end to arm 55 and provided with a slot 77 which rides on pin 79 on a wedge-shaped element 81. Spring 83 urges element 81 toward the left until pin 79 engages the lefthand end of slot 77. Plunger 75 of solenoid 116 is shown in the position in which solenoid 116 is energized.

Needle 85, which is arranged to move with element 81, is the diastolic pressure indicating needle.

The movement of the bellows for a given change in pressure in enclosure 37 increases as pressure increases. Thus, the movement of member 45 is not a linear function of pressure. This results partly from the fact that as the angles of the folds of the bellows are made more acute, the components of the forces parallel to the axes of the bellows which tend to counteract movement of member 45 become weaker in magnitude. The relationship between bellows movement and pressure is complicated and a detailed analysis is unnecessary. Empirically, the relationship has been found to approximate a cotangent function, that is, the displacement of the bellows measured from the end closure of the bellows (member 45) to a fixed reference point on the axis of the bellows is nearly proportional to the cotangent of the pressure applied. This is true at least within the range of operation of the particular bellows described here.

The horizontal displacement of the connecting rod 43, 47 is related to the angular displacement (measured from the horizontal) of crank arm 51 by a cosine function. The connecting rod is made long in comparison to the length of arm 51 so that it remains substantially horizontal. The movements of both its ends in the horizontal direction are therefore substantially the same.

The cosine function is very nearly equal the contangent function for angles in the vicinity of 90°, and consequently, the linear displacement of the element 45 at the end of the bellows corresponds approximately to the cotangent of the angle between arm 51 and the horizontal. Since the displacement of pivot 45 also corresponds approximately to the cotangent of the pressure applied, the result is that the relationship between the pressure applied to the bellows and the angular displacement of the crank arm 51 is made linear to a good approximation. The length of the pushrod is adjusted by means 49 so that, when the end closure of the bellows is at the fixed reference point referred to above, arm 51 is vertical.

The angular displacements of the indicator needles 71 and 85 are substantially proportional to the angular displacement of arm 51 when the solenoids are energized. Good accuracy has been obtained with this apparatus, and it is not necessary to use non-linear scales with the needles.

Referring again to FIGURE 1, a two-stage amplifier comprising transistors 14 and 16 is provided to receive signals from the preamplifier through capacitor 18. Potentiometer 20 is provided in the emitter circuit of transistor 14 to permit adjustment of the gain of the amplifier. The return to ground for the emitter of transistor 16 is provided through the collector and emitter, respectively, of transistor 22, the function of which, as will be more apparent from the subsequent detailed description, is to prevent the amplifier from passing signals after the last Korotkoff sound is received.

The load in the collector circuit of transistor 16 is a tuned circuit comprising capacitor 24 and primary winding 26 of transformer 28 in parallel. The parameters of the elements of the tuned circuit are desirably such that the circuit resonates at approximately 80 cps. The tuned circuit acts as a band pass filter, readily passing signals in the vicinity of 80 cps. to the secondary of transformer 28, and attenuating signals above and below 80 cps. Of course, any suitable filter can be used, and it is not necessary that the filter comprise a winding of a transformer.

The frequencies of interest are below the resonant frequency of this filter, and consequently they fall on the increasing slope of the characteristic band-pass curve of the filter. The filter passes higher pitched Korotkoff sounds more readily and therefore compensates for the fact that they may be weaker than the lower pitched sounds.

Transistor 16, since it is a latter stage of the amplifier is not affected adversely by pulsations in its power supply. Consequently, it is connected to receive power through line 30 from bus 32.

The secondary of transformer 28 is provided with a grounded center-tap, and a full-wave rectifier comprising diodes 34 and 36 delivers the output of transformer 28 to line 38. Resistor 40 and potentiometer 42 are connected in series between line 38 and ground. These resistors provide a discharge path for capacitor 44, which is likewise connected between line 38 and ground. Between line 38 and ground, there is also connected in series a resistor 46 and capacitor 48. Capacitor 48 acts as an integrator. Its charging path is through resistor 46, and it is discharged through resistors 46 and 40 and potentiometer 42.

Signals taken from the output of the signal processing circuitry at line 38 are fed in the input of the logic circuit which will now be described.

Specifically, the output of the signal processor is delivered through line 38 and through capacitor 50 to the trigger input of a pulse-shaping multivibrator comprising transistors 52 and 54. This multivibrator is a conventional one-shot multivibrator having a very short time constant; considerably shorter than the duration between normal Korotkoff sounds. It is provided to deliver uniform, rectangular pulses in response to irregular pulses appearing at the base of transistor 52.

Capacitor 56 is provided to deliver a negative pulse to the base of transistor 54 to trigger the multivibrator when the power is turned on through closure of switch 4.

The output of this multivibrator, taken from the collector of transistor 54, is fed to the base of an emitter-follower comprising transistor 58.

The output of the emitter-follower is fed through diode 60 and resistors 62 and 64 to the base of transistor 66, which with transistor 68, constitutes a second one-shot multivibrator. A capacitor 70 is provided between the power supply bus 32 and the junction between resistors 62 and 64. Capacitor 70 forms part of this multivibrator, and is charged through resistors 72 and 64. When transistor 58 conducts in response to pulses from the pulse-shaping multivibrator, capacitor 70 tends to discharge through resistor 62, diode 60 and through the emitter and collector of transistor 58. When transistor 58 is conducting, the multivibrator comprising transistors 66 and 68 flips to its unstable state (transistor 68 cut-off). When the pulses cease, capacitor 70 charges through resistors 64 and 72, and, when the base of transistor 66 becomes sufficiently positive, the multivibrator flips to its stable state.

This multivibrator, then, remains in its unstable state as long as pulses are received from the pulse shaping multivibrator. The delay between the cessation of pulses and the flipping of the multivibrator back to its stable state is desirably of the order of three seconds.

Capacitor 70 also causes this multivibrator to flip to its unstable state when on-off switch 4 is closed. This flipping is caused by the negative transient which passes through capacitor 70 when bus 32 is energized, capacitor 70 being initially uncharged.

A two-stage amplifier comprising transistors 74 and 76 receives the output of the one-shoe multivibrator comprising transistors 66 and 68 through diodes 78. The output of this amplifier operates an indicator lamp 80.

From the collector of transistor 76, there is a connection through diode 81 to the junction between resistor 46 and capacitor 48 in the signal processing circuit.

Transistors 74 and 76 are coupled through a Zener diode 82 and resistor 84. The base of transistor 76 is connected to bus 32 through resistor 86.

This amplifier operates to energize lamp 80 to indicate the presence of Korotkoff sounds.

The parameters of Zener diode 82 and of resistors 84 and 86 are chosen so that, if the voltage available from battery 2 under load falls below a certain value, Zener diode 82 will fail to conduct, and consequently, indicator lamp 80 will fail to light when Korotkoff pulses occur. Lamp 80, then, indicates whether the battery needs to be replaced.

A bistable multivibrator comprising transistors 88 and 90 receives an input from the collector of transistor 68 through diode 92, capacitor 94 and resistor 96. The base of transistor 88 is connected to the negative supply bus 32 through capacitor 98 and diode 100. Capacitor 98 insures that this multivibrator will be in the state in which transistor 88 is conducting when switch 4 closes. A negative pulse appearing at the base of transistor 90 causes this multivibrator to flip to the condition in which transistor 90 is conducting. If, however, the bases of both transistors 88 and 90 receive negative pulse simultaneously, the multivibrator will flip to the condition to which transistor 88 conducts. A decoupling resistor 96 is provided for this purpose.

The output of the bistable multivibrator is taken from the collector of transistor 90, and is arranged to drive an amplifier comprising transistors 102 and 104 in cascade. The output of this amplifier energizes solenoid 106 when the bistable multivibrator is in the condition in which transistor 90 is cut off.

The collector of transistor 104 is also connected through diode 108 and resistor 110 to the base of transistor 112 which constitutes the first stage of a two-stage amplifier also comprising transistor 114. The collector of transistor 114 is connected to ground through solenoid 116.

It will be apparent that, when solenoid 106 is energized, solenoid 116 will also be energized. These solenoids are the gauge control solenoids shown in FIGURE 2, which are arranged to arrest the movement of their respective gauge indicators when they are not energized. When energized, they permit free movement of the gauge indicators in response to pressure. Solenoid 106 is associated with the systolic gauge, and solenoid 116 is associated with the diastolic gauge.

An input to the amplifier comprising transistors 112 and 114 is also provided through diode 118 from the emitter of transistor 58. Thus, solenoid 116 will be energized intermittently by pulses from the pulse-shaping multivibrator comprising transistors 52 and 54 even though solenoid 106 may be deenergized.

A gate circuit comprising diodes 120 and 122 is associated with the base of transistor 22 through resistor 124. The cathode of diode 120 is connected to the ungrounded side of solenoid 106 through line 126. The cathode of diode 122 is connected through resistor 128 and through line 130 to the collector of transistor 76.

If a negative signal appears at the cathode, of either of these diodes, transistor 22 will conduct to apply a positive voltage to the emitter of transistor 16 thus allowing it to amplify.

The overall operation of the invention will now be described with reference to FIGURES 1 and 4. The horizontal axes of the diagrams in FIGURE 4 represent time.

As the cuff is inflated, actuator 5 closes switch 4 to deliver operating power to the circuit. At this time, the transient through capacitor 70, triggers the multivibrator comprising transistors 66 and 68 to the condition in which transistor 68 is cut-off. Lamp 80 lights at this time, indicating that the power has been turned on. The transient through capacitor 98 likewise causes the bistable multivibrator to flip to the condition in which transistor 88 is conducting, so that solenoid 106 is energized, permitting the systolic gauge indicator to respond to pressure in the cuff. Solenoid 116 is likewise energized through the amplifier comprising transistors 112 and 114. Both gauges read the pressure in the cuff as it is being inflated so that they indicate a pressure above systolic before the cuff is allowed to deflate.

Since both lamp 80 and solenoid 106 are energized, at this time, both diodes 120 and 122 conduct and transistor 22 conducts, permitting transistor 16 to amplify signals from the microphone.

As cuff pressure increases, a first set of Korotkoff sounds appears. These pulses are picked up by the microphone, and the signals are amplified and rectified by the full-wave rectifier comprising diodes 34 and 36. Capacitors 44 and 48 are charged by pulses appearing in line 38 from the output of the full-wave rectifier. These pulses operate the pulse-shaping multivibrator, and the multivibrator comprising transistors 66 and 68 is held in the condition in which transistors 68 is cut-off until three seconds after the pulses cease as the cuff pressure increases above systolic. After three seconds, transistor 68 conducts, the lamp 80 goes out and capacitor 48 discharges through diode 81 and the lamp. Capacitor 44 discharges readily through resistors 40 and 42 and through resistor 46, diode 81 and lamp 80.

The lamp, having been extinguished, indicates that the pressure in the cuff is sufficiently high that pumping can be stopped. The air is now allowed to escape slowly through restricted orifice 29 by opening valve 27. It will be apparent that if the cuff is inflated quickly to a sufficiently high pressure, it is not necessary to wait for the light to go out before pumping is stopped.

As cuff pressure decreases through systolic, a first Korotkoff sound occurs. As will be apparent from a later description of the details of the signal distinguishing circuit, a pulse will appear in line 38. This pulse triggers the pulse-shaping multivibrator, which in turn, triggers the second monostable multivibrator so that transistor 68 flips to its cut-off condition. The flipping produces a negative pulse at the collector of transistor 68, which is conducted by diode 92 to flip the bistable multivibrator to the condition in which transistor 90 conducts. Solenoids 106 and 116 are deenergized and the reading of systolic pressure is retained on both gauges. Transistor 76 goes into conduction since the second monostable multivibrator is in its unstable condition at this time. Consequently transistor 22 conducts so that transistor 16 is allowed to amplify. Only one of diodes 120 and 122 needs to be supplied with a negative signal in order for transistor 22 to conduct. Lamp 80 goes on at this time.

The first Korotkoff sound may be relatively weak, but a pulse is passed through line 38 since capacitor 48 previously held little charge. Often, the sounds occurring after diastolic pressure are almost identical with the first Korotkoff sound in amplitude and waveshape. If they were introduced side by side on the trace of an oscilloscope, they would be indistinguishable. Prior apparatuses have been unable to distinguish them, and consequently they may obtain erroneously low readings of diastolic pressure. This invention, however, takes into account the fact that the first Korotkoff sound is not preceded by Korotkoff sounds, while the sounds which occur after diastole are preceded.

Before the first Korotkoff sound occurs as cuff pressure is decreasing, capacitor 48 is almost completely discharged. Capacitor 44 is charged readily by noise falling within the pass band of the filter so that its charge corresponds to the patient's noise level. Any pulses below a certain level determined by the integrated noise voltage in capacitor 44 will not be passed by the full-wave rectifier. Resistor 40 and potentiometer 42 are chosen so that after a pulse is passed by the rectifier to charge capacitor 44, it is discharged rapidly with respect to the interval between pulses so that its charge corresponds to the integrated noise voltage plus a relatively small charge resulting from preceding pulses before the next pulse appears.

Capacitor 48 acts as an integrator. It is charged through resistor 46 primarily by pulses passed by the full wave rectifier. It discharges slowly through resistors 46, 40 and 42 so that it, in effect, "remembers" pulses. A voltage impressed on line 38 at the junction between diodes 34 and 36 which decreases slowly following each pulse. If the voltage appearing at the cathode of either of diodes 34 or 36 is greater than the voltage at the junction at the time a pulse occurs, the voltage in line 38 increases, capacitor 48 is charged, and the increase in voltage appears as a pulse at the base of transistor 52 since capacitor 50 acts as a differentiator. The pulse-shaping multivibrator (transistors 52 and 54) is triggered by this pulse.

The discharge time constant of capacitor 48, which is established by resistors 46, 40 and 42, should be appreciably longer than the expected interval between Korotkoff sounds, for example, it might be of the order of five seconds.

As pulses of approximately equal amplitude appear at the secondary of transformer 28, the voltage between line 38 and ground varies between two more or less definite levels since an equilibrium is reached in the operation of the circuit. If, however, the pulses are decreasing in energy, these levels slowly decrease. As the pulses occur, the voltage levels are influenced more by immediately preceding pulses than by remote pulses. The "memory" of the remote pulses fades. The amplitude of the pulses at the secondary of the transformer are influenced by the amplitude, frequency and energy content of each pulse picked up by the microphone.

If a subsequent pulse at the secondary of the transformer has two little energy compared to the integrated voltage caused by the immediately preceding pulses, diodes 34 and 36 block it, and no effect is preceived at the base of transistor 52 of the pulse-shaping multivibrator. The voltage on line 38 continues to decrease slowly, making the integrator more and more sensitive to pulses of low energy. Thus, if the rate of decrease in amplitude of the pulses passed by the filter is above a certain level determined by the rate of discharge of capacitor 48, no more pulses will be passed, and the diastolic indicator will be locked at the time when the last pulse is passed. The cuff pressure at that time was the true diastolic pressure. If no pulses of sufficient energy appear before three seconds have elapsed (the time delay of the multivibrator comprising transistors 66 and 68), the apparatus considers the diastolic point to have been reached. It will be apparent that weak signals will be treated similarly to strong signals since the levels of variation of the integrator voltage will be correspondingly lowered. As mentioned previously, the sounds which occur following diastole may be identical in all respects to the first Korotkoff sound. But, since the integrator is filled to a level corresponding to the Korotkoff sounds preceding diastole, sounds occurring after diastole are not passed by diodes 34 and 36.

The rate of change of energy, or the slope of the leading edge of a pulse passed by the integrator must be above a certain level if it is to be considered to be a Korotkoff sound. In FIGURE 6, the slope of the leading edges of the pulses appearing at the secondary of transformer 28 are decreasing. The slope of the leading edges of pulse P and subsequent pulses are not sufficient to produce a pule at the base of transistor 52 to overcome the trigger level. Pulse Q therefore determines the diastolic point. A definite signal level is required on the base of transistor 52 in order to trigger the pulse shaping multivibrator, and only when the signal passed by capacitor 50 is above that level does the pulse shaper respond. The parameters of the circuit are chosen so that the pulse shaper only responds when the pulses delivered through line 38 have a sufficiently steep leading edge to be identified as Korotkoff sounds.

Returning to the operation of the logic circuitry, for each operation of the pulse-shaping multivibrator corresponding to a Korotkoff sound, a negative pulse appears at the base of transistor 58. Solenoid 116, which had been deenergized at the systolic point is intermittently energized in response to these negative pulses through the operation of transistors 112 and 114. The diastolic indicator, associated with this solenoid is released and arrested intermittently and moves in steps toward diastolic pressure. When the pulse-shaper ceases to operate, solenoid 116 remains deenergized, and the reading of diastolic pressure is retained on the diastolic gauge. Diode 108 prevents solenoid 106 from being energized while solenoid 116 is being energized intermittently.

After the multivibrator comprising transistors 66 and 68 has returned to its stable condition (transistor 68 conducting), lamp 80 is extinguished, indicating that the gauges may be read. Neither of diodes 120 and 122 is conducting and the amplifier comprising transistor 16 is desensitized. Consequently, further sounds picked up by the microphone have no effect.

As cuff pressure decreases further, switch 4 opens, removing operating power from the apparatus. The apparatus is now ready for another measurement which can be initiated simply by pumping up the cuff.

Various aspects of the circuit, which will be described below, have not been included in the description of the overall operation of this invention for the sake of simplicity.

As mentioned previously, Korotkoff sounds may disappear for a short time and reappear shortly before diastolic pressure is reached. A similar effect occurs when a sound has too little energy to be passed by the integrator, but subsequent sounds meet all the requirements of Korotkoff sounds. In some apparatuses and often in manual measurements, these effects result in diastolic readings which are erroneous in that they are too high. The three second time delay provided by the monostable multivibrator (transistors 66 and 68) prevents the diastolic reading from being taken, in effect, too soon. In FIGURE 5, for example, pulse R is not of sufficient amplitude to be passed by the full wave rectifier since the voltage on line 38 is too great at the time pulse R appears. Consequently, no corresponding signal appears at the base of transistor 52. Pulse S, appearing later, but within three seconds of the last pulse passed by the rectifier is sufficient to overcome the voltage now in line 38 and a corresponding pulse triggers transistor 52.

The filter comprising capacitor 24 and primary coil 26 assists the integrator in distinguishing Korotkoff sounds from sounds which occur subsequent to passage through diastolic pressure. Most of the energy in the sounds which occur subsequent to diastole may be in a lower frequency range than that of the Korotkoff sounds which occur prior to diastole. The parameters of the resonant circuit are chosen so that the peak of the energy spectrum of the Korotkoff sounds which occur prior to diastole falls within the low frequency roll off slope of the band-pass curve of the resonant circuit. As diastole is passed, the signals passed by transformer 28 are greatly attenuated. Unwanted signals might otherwise trigger the pulse-shaping multivibrator if the charge in the integrator is so low that they are not blocked by diodes 34 and 36. Capacitor 50 is also instrumental in distinguishing Korotkoff sounds from unwanted sounds since it passes pulses having steeper leading edges more readily than slowly rising pulses.

Two adjustments are provided for calibration of the apparatus, which is desirably accomplished by comparing the readings obtained with those obtained by catheterization testing, which is generally accepted as being the most accurate method of measuring blood pressure. Alternatively the readings can be made to correspond to those obtained by a physician with a stethoscope and sphygmomanometer.

Potentiometer 20 is a gain adjustment for the audio amplifier. It affects the ability of the apparatus to perceive weak initial or "systolic" signals. It also has some effect on the diastolic point, since, if the audio gain is too high, sounds subsequent to diastole will be passed by the integrator. Potentiometer 20 should be adjusted so that the reading of systolic pressure is correct by one of the methods discussed above.

Potentiometer 42 adjusts the discharge time constant of the integrator. Alternatively, resistor 46 could be made adjustable, and the same effect would be obtained. If its resistance is lowered, the discharge rate is increased, permitting weaker signals to be passed by the integrator. This delays final locking of the diastolic gauge, and, consequently lowers the diastolic reading. During calibration, potentiometer 42 should be adjusted so that the diastolic reading compares with that obtained by one of the above methods.

Referring to FIGURES 1 and 3, the circuitry shown in FIGURE 3 can be substituted for that shown within the dashed lines in FIGURE 1 to provide a modification of the invention. It will be apparent that the only change made is the connection of the cathode of diode 118 to the collector of transistor 76 and the disconnection of the cathode of diode 118 from the emitter of transistor 58.

With the circuit in the modified form, solenoid 116, which is associated with the diastolic pressure gauge, remains energized whenever the monostable multibrator comprising transistors 66 and 68 is in its unstable state. The output of the monostable multivibrator is amplified by transistors 74 and 76, and by transistors 112 and 114 so that solenoid 116 is energized, releasing the diastolic gauge, until the monostable multivibrator flips back to its stable state after a predetermined period after signals from the signal distinguishing circuit cease to appear at which time the diastolic gauge is arrested. The above described signal processing circuit provides for good diastolic readings with this modification.

With this modification, it is not necessary that the rate of decrease of pressure in the cuff be constant or that the rates be the same for different measurements. The difference between the energies of successive pulses depends on the rate at which air is bled from the cuff. If air is bled at a high rate, the integrator will not pass some pulses which would ordinarily be passed if the bleed rate were slower since the rate of decrease of energy between successive pulses is greater than the rate of discharge of the integrator. The cuff pressure reaches diastolic earlier and the indicator of the diastolic gauge is locked earlier. Substantial variations in the bleed rate can therefore occur without greatly impairing the accuracy of the diastolic pressure reading.

It will be apparent that the various details of construction can be changed and various other modifications can be made to the apparatus described without departing from the invention as defined in the following claims.

What is claimed is:

1. An apparatus for measuring blood pressure comprising an inflatable cuff, means for inflating said cuff, first and second pressure indicating means connected to indicate pressure of gas within said cuff, means for deflating said cuff, means for detecting Korotkoff sounds and providing electrical pulses in response thereto, control means receiving the output of said means for detecting Korotkoff sounds, means for arresting the indication of said second pressure indicating means and retaining a reading of pressure thereon, said control means causing said means for arresting the indication of said first pressure indicating means to arrest said indication when said detecting means detects a first Korotkoff sound as pressure within said cuff is decreasing and said control means causing said means for arresting the indication of said second pressure indicating means to release said second presure indicating means for a predetermined interval following the detection of each Korotkoff sound, said interval being shorter than the interval between the onset of a Korotkoff sound and the onset of the next succeeding Korotkoff sound.

2. An apparatus according to claim 1, in which said control means includes means for desensitizing said means for detecting Korotkoff sounds a predetermined time after said detecting means ceases to receive Korotkoff sounds.

3. An apparatus for measuring blood pressure comprising an inflatable cuff, means for inflating said cuff, first and second pressure indicating means connected to indicate pressure of gas within said cuff, means for deflating said cuff, electric transducer means for detecting Korotkoff sounds, filtering means receiving the output of said detecting means and having a characteristic such that it passes higher frequencies progressively more readily within a range of frequencies, the frequencies which constitute the significant components of Korotkoff sounds falling within said range, control means receiving the output of said filtering means, means for arresting the indication of said first pressure indicating means and retaining a reading of pressure thereon, and means for arresting the indication of said second pressure indicating means and retaining a reading of pressure thereon, said control means causing said means for arresting the indication of said first pressure indicating means to arrest said indication when said detecting means detects a first Korotkoff sound as pressure within said cuff is decreasing and said control means causing said means for arresting the indication of said second pressure indicating means to release said second pressure indicating means when said detecting means receives Korotkoff sounds.

4. An apparatus for measuring blood pressure comprising an inflatable cuff, means for inflating said cuff, first and second pressure indicating means connected to indicate pressure of gas within said cuff, means for deflating said cuff, means for detecting Korotkoff sounds and providing electrical pulses in response thereto, distinguishing means receiving the output of said detecting means and providing a pulse at its output when a pulse appears at its input, the amplitude of which exceeds a minimum amplitude, said minimum amplitude decreasing with time from a value determined by the amplitudes of preceding pulses received at the input of said distinguishing means, control means receiving the output of said distinguishing means, means for arresting the indication of said first pressure indicating means and retaining a reading of pressure thereon, and means for arresting the indication of said second pressure indicating means and retaining a reading of pressure thereon, said control means causing said means for arresting the indication of said first pressure indicating means to arrest said indication when said distinguishing means passes a first pulse as pressure within said cuff is decreasing and said control means causing said means for arresting the indication of said pressure indicating means to release said second pressure indicating means when said distinguishing means passes pulses.

5. An apparatus for measuring blood pressure comprising an inflatable cuff, means for inflating said cuff, first and second pressure indicating means connected to indicate pressure of gas within said cuff, means for deflating said cuff, means for detecting Korotkoff sounds and providing electrical pulses in response thereto, filtering means connected to receive the output of said detecting means, said filtering means having a characteristic such that it passes higher frequencies progressively more readily within a range of frequencies, the frequencies, which constitute the significant components of Korotkoff sounds falling within said range, distinguishing means receiving the output of said filtering means and providing a pulse at its output when a pulse appears at its input, the amplitude of which exceeds a minimum amplitude, said minimum amplitude decreasing with time from a value determined by the amplitudes of preceding pulses received at the input of said distinguishing means, control means receiving the output of said means for detecting said Korotkoff sounds, means for arresting the indication of said first pressure indicating means and retaining a reading of pressure thereon, and means for arresting the indication of said second pressure indicating means and retaining a reading of pressure thereon, said control means causing said means for arresting the indication of said first pressure indicating means to arrest said indication when said distinguishing means passes a first pulse as pressure within said cuff is decreasing and said control means causing said means for arresting the indication of said second pressure indicating means to release said second pressure indicating means when said distinguishing means passes pulses.

6. An apparatus for measuring blood pressure comprising an inflatable cuff, first and second pressure indicating means having movable indicators, means connecting both said indicating means to the interior of said cuff to read the pressure of gas within said cuff, means for arresting the movement of the indicator of said first indicating means, means for arresting the movement of the indicator of said second indicating means, means for detecting Korotkoff sounds and providing electrical pulses in response thereto, and a control circuit comprising a monostable multivibrator connected to receive said pulses and remaining in its unstable state continuously when it receives a series of said pulses, a bistable multivibrator connected to be triggered from a first state to a second state when said monostable multivibrator flips to its unstable state, said means for arresting the movement of the indicator of said first indicating means being connected to an output of said bistable multivibrator to arrest the movement of said last-mentioned indicator when said bistable multivibrator is in said second state, and said means for arresting the movement of the indicator of said second indicating means being connected to said means for detecting Korotkoff sounds and releasing said indicator of said second indicating means when electrical pulses appear at the output of said detecting means.

7. An apparatus according to claim 6, including triggering means for said bistable multivibrator and a pressure-sensitive actuator arranged to sense pressure within said cuff and connected to operate said triggering means to switch said bistable multivibrator to its said first state when the pressure within said cuff passes a predetermined level in the direction of increasing pressure.

8. An apparatus for measuring blood pressure comprising an inflatable cuff, first and second pressure indicating means having movable indicators, means connecting both said indicating means to the interior of said cuff to read the pressure of gas within said cuff, means for arresting the movement of the indicator of said first indicating means, means for arresting the movement of the indicator of said second indicating means, means for detecting Korotkoff sounds, means amplifying the output of said detecting means, a first monostable multivibrator receiving the output of said amplifying means and providing electrical pulses in response to said Korotkoff sounds, and a control circuit comprising a second monostable multivibrator connected to receive said pulses and remaining in its unstable state continuously when it receives a series of said pulses, a bistable multivibrator connected to be triggered from a first state to a second state when said second monostable multivibrator flips to its unstable state, said means for arresting the movement of the indicator of said first indicating means being connected to an output of said bistable multivibrator to arrest the movement of said last-mentioned indicator when said bistable multivibrator is in said second state, and said means for arresting the movement of the indicator of said second indicating means being connected to the output of said first monostable multivibrator and releasing said indicator of said second indicating means when electrical pulses appear at the output of said first monostable multivibrator.

9. In a blood pressure measuring apparatus, means for distinguishing desired sounds from other pulsatile sounds and providing output pulses only in response to said desired sounds comprising a mechanical-to-electrical transducer, an amplifier receiving at its input the output of said transducer and providing an output, a filter connected to receive the output of said amplifier, the characteristic of said filter being such that if the frequencies contained in the desired sounds increase, the amplitude of the output of said filter is greater, rectifying means connected to receive the output of said filter, integrating means receiving the output of said rectifying means, said integrating means including a capacitive means connected to be charged in response to signals passed by said rectifying means and resistive means for slowly discharging said capacitive means, and means receiving the output of said integrating means and providing said output pulses when the charge on said capacitive means increases at a rate exceeding a predetermined rate.

10. In a blood pressure measuring apparatus, a mechanical-to-electrical transducer, means amplifying the output of said transducer, filtering means connected to filter the output of said amplifying means, said filtering means having a characteristic such that it passes higher frequencies progressively more readily within a range of frequencies, the frequencies, which constitute the significant components of Korotkoff sounds falling within said range, and distinguishing means receiving the output of said filtering means and providing a pulse at its output when a pulse appears at its input, the amplitude of which exceeds a minimum amplitude, said minimum amplitude decreasing with time from a value determined by the amplitude of preceding pulses received at the input of said distinguishing means.

11. In an apparatus for measuring blood pressure, the combination comprising a mechanical-to-electrical transducer, an amplifier connected to receive at its input the output of said transducer, rectifying means connected to receive the output of said amplifier, a capacitor connected to be charged by the output of said rectifying means, resistive means connected to discharge said capacitor, a monostable multivibrator, means for triggering said monostable multivibrator to its unstable state, a capacitor connected to couple the output of said rectifying means to the input of said triggering means, a first electrical-to-mechanical transducer, means receiving an output from said monostable multivibrator for energizing said first electrical-to-mechanical transducer in response to transition of said monostable multivibrator to its unstable state, a second electrical-to-mechanical transducer, means for energizing said second electrical-to-mechanial transducer simultaneously with energization of said first electrical-to-mechanical transducer and additional means for energizing said second electrical-to-mechanical transducer receiving an output from said means for triggering said monostable multivibrator, said additional means energizing only said second transducer in response to signals from said rectifying means.

12. In an apparatus for measuring blood pressure, the combination comprising a mechanical-to-electrical transducer, an amplifier connected to receive at its input, the output of said transducer, rectifying means connected to receive the output of said amplifier, a capacitor connected to be charged by the output of said rectifying means, resistive means connected to discharge said capacitor, a monostable multivibrator, means for triggering said monostable multivibrator to its unstable state, a capacitor connected to couple the output of said rectifying means to the input of said triggering means, a first electrical-to-mechanical transducer, means receiving an output from said monostable multivibrator for energizing said first electrical-to-mechanical transducer in response to transition of said monostable multivibrator to its unstable state, a second electrical-to-mechanical transducer, means for energizing said second transducer in response to energization of said first electrical-to-mechanical transducer, additional means for energizing said second transducer in response to signals from said rectifying means, means for desensitizing said amplifier, means connected to said monostable multivibrator and providing an output signal when said monostable multivibrator is in its unstable state, a gate having two inputs, receiving at one of said inputs said output signal of said last-mentioned means and receiving at the other of said inputs a signal from the output of said means for energizing said first electrical-to-mechanical transducer, the output of said gate operating said desensitizing means to desensitize said amplifier only when neither of said signals is present at the inputs of said gate.

13. In an apparatus for measuring blood pressure, the combination comprising means for detecting pulse beats and providing electrical signals in response thereto, bandpass filtering means receiving said electrical signals, the pass band of said filtering mean being in the range such that Korotkoff sounds fall on the low frequency side of said pass band, rectifying means receiving the output of said filtering means, a first capacitor arranged to be charged by the output of said rectifying means, resistive means for discharging said capacitor, a second capacitor, resistive means through which the output of said filter charges said second capacitor, a monostable multivibrator connected to be held in its unstable state in response to pulses appearing at the output of said rectifying means and means responsive to the output of said multivibrator for discharging said second capacitor when said multivibrator returns to its stable state.

14. In a blood pressure measuring apparatus, means for distinguishing desired sounds from other pulsatile sounds and providing output pulses only in response to said desired sounds comprising a mechanical-to-electrical transducer, an amplifier receiving at its input the output of said transducer and providing an output, a filter connected to receive the output of said amplifier, the characteristic of said filter being such that if the frequencies contained in the desired sounds increase, the amplitude of the output of said filter is greater, rectifying means connected to receive the output of said filter, integrating means receiving the output of said rectifying means and providing an output determined by the amplitudes of the signals previously received at its input, and means receiving the output of said integrating means and providing said output pulses when the amplitude of the output of said integrating means increases at a rate in excess of a predetermined rate.

15. An apparatus for determining systolic and diastolic blood pressure comprising a gas containing cuff for constricting an artery, means for pressurizing the gas within said cuff, means for permitting gas to escape slowly from said cuff, transducing means for receiving elastic signals and for converting said signals to electrical pulses, capacitive means connected to be charged in response to said electrical pulses, resistive means for slowly discharging said capacitive means, differentiating means responsive to the rate of change of the charge on said capacitive means and providing an output signal when the charge on said capacitive means changes, triggering means connected to receive said output signal of said differentiating means and providing an output signal when a signal appears at its input in excess of a predetermined amplitude, and means responsive to the output of said triggering means and the pressure of gas within said cuff for indicating systolic pressure when said triggering means provides a first signal at its output as the pressure of said gas is decreasing and for indicating diastolic pressure after said triggering means provides a last signal at its output as the pressure of said gas is decreasing.

References Cited

UNITED STATES PATENTS

| | | | |
|---|---|---|---|
| 3,308,811 | 3/1967 | Gillette et al. | 128—2.05 |
| 3,319,623 | 5/1967 | London | 128—2.05 |
| 1,028,540 | 6/1912 | Chatillon. | |
| 1,782,670 | 11/1930 | Van Duyn. | |
| 2,073,457 | 3/1937 | Schwarzschild | 128—2.05 |
| 2,347,325 | 4/1944 | Kirschbaum | 179—100.3 |
| 2,379,573 | 7/1945 | Gilson | 128—2.05 |
| 2,699,465 | 1/1955 | Hamilton | 179—5 |
| 2,710,001 | 6/1955 | Freyburger | 128—2.05 |
| 2,815,748 | 12/1957 | Boucke | 128—2.05 |
| 2,887,881 | 5/1959 | Jones | 73—388 |
| 2,987,920 | 6/1961 | Du Bois | 73—388 |
| 3,117,570 | 1/1964 | Halasz et al. | 128.2.05 |

RICHARD A. GAUDET, *Primary Examiner.*

S. BRODER, *Assistant Examiner.*